United States Patent [19]

Kielma

[11] 4,443,928
[45] Apr. 24, 1984

[54] MULTIPLE-SPINDLE TOOL CHANGER

[75] Inventor: Ervin J. Kielma, West Allis, Wis.

[73] Assignee: Kearney & Trecker Corporation, West Allis, Wis.

[21] Appl. No.: 341,562

[22] Filed: Jan. 21, 1982

[51] Int. Cl.³ .............................................. B23Q 3/157
[52] U.S. Cl. ..................................... 29/568; 29/26 A; 72/446
[58] Field of Search ............... 29/26 R, 568, 39; 414/744 R, 744 A; 408/35; 72/446, 389

[56] References Cited

U.S. PATENT DOCUMENTS

| | | | |
|---|---|---|---|
| 3,566,516 | 3/1971 | Brainard et al. | 29/568 |
| 3,571,912 | 3/1971 | Kielma | 29/568 |
| 3,646,664 | 3/1972 | Veark | 29/568 |
| 4,182,205 | 1/1980 | Baker | 29/26 R |
| 4,188,815 | 2/1980 | Mizushima | 29/568 |
| 4,227,296 | 10/1980 | Wittenbreder | 29/568 |

FOREIGN PATENT DOCUMENTS 2019752 11/1979 United Kingdom ................... 29/39

OTHER PUBLICATIONS

"Cross N/C Multi-Center" by The Cross Company in Nov. 1974 and Used as Form 1685.

Primary Examiner—William R. Briggs
Attorney, Agent, or Firm—Quarles & Brady

[57] ABSTRACT

Apparatus for simultaneously changing all of the tools in a multiple spindle machining center is provided with a number of tool carrying devices, each device corresponding to a different one of the spindles. Each tool carrying device is capable of selectively engaging each of a number of tools which are dedicated for use with one of the spindles, and is further capable of carrying engaged tools between one of the spindles and one of a plurality of tool storage magazines. A first linear translation device moves each of the tool carrying devices in parallel relationship with a first axis when the tool carrying devices are carrying tools between the spindles and the magazines, and a second linear translation device moves the tool carrying devices in parallel relationship with a second axis during such tool carrying operations, the first and second axes being in orthogonal relationship. The tool carrying devices are mounted upon a single rigid bar, the axis of the bar being orthogonal to both the first and second axis. A rotational device selectively rotates the bar and the tool carrier devices around the axis of the bar during tool carrying operations.

14 Claims, 11 Drawing Figures

MULTIPLE-SPINDLE TOOL CHANGER

BACKGROUND OF THE INVENTION

The invention disclosed and claimed herein generally pertains to automatic tool changing apparatus of the type which is used to change all of the tools in a multiple-spindle machining center simultaneously. More particularly, the invention pertains to apparatus of the above type wherein the axes of all the tools dedicated for use by a particular spindle of the machining center are maintained in a common plane as such tools are respectively stored in a magazine, moved between the magazine and the particular spindle, or inserted into the particular spindle for use in a machining operation. Even more particularly, the invention pertains to apparatus of the above type wherein a number of tool carrying devices, one dedicated to each spindle, are constrained to rotate around a common axis during a tool change operation, the spindles and magazines remaining immobile during such operation.

Devices for automatically and simultaneously changing all of the tools in a multiple-spindle machining center are by now well known in the art. One of the first of such devices is shown in U.S. Pat. No. 3,571,912, which was issued Mar. 23, 1971 to Mr. Ervin J. Kielma, inventor of the present invention. Another of such prior art devices is disclosed in U.S. Pat. No. 4,227,296, issued Oct. 14, 1980 to Eduard Wittenbreder.

In a standard arrangement for such tool changing devices, as taught by the above art, a tool storage unit is positioned adjacent to a machining center or machine tool which has two or more spindles. The tool storage unit is provided with a number of magazines which are generally in spaced-apart parallel relationship with one another, the spindles of the machining center also being in parallel relationship with one another. A number of tool carrying members are mounted along a row, each member corresponding to one of the magazines and also to one of the spindles. Each member is provided with two opposingly directed arms, a tool grip element being attached to the end of each arm of each member.

In some prior art devices of the above type, it is necessary to move or maneuver the magazines or spindles, relative to one another, in order for a tool change operation to take place. In other of such prior art devices, the tool carrying members, aligned in a row as aforesaid, must be rotated through one or more 180° arcs around separate axes, as each tool change operation is performed. In order to prevent interferences between adjacent members and tools carried thereby during rotations, a minimum spacing must be maintained between adjacent members. Such condition may, in turn, impose a minimum spacing limitation upon the spindles of the machining center. In order to achieve compatability between the machining center and the tool change device, it could be necessary to locate the spindles of the center so far apart from one another that certain machining operations could not be performed by the center. Also, the minimum spacing or separation of the spindles could thereby be made significantly greater than the spacing which would be required only by the dimensions of the spindles and spindleheads of the center.

The present invention provides apparatus for changing tools in a multiple-spindle machining center wherein a number of tool change carriers are constrained to rotate about a common axis during a tool change operation. The carriers are further constrained to linearly translate along first and second axes, which are orthogonal to one another and to the common axis. By employing such apparatus, tools may be exchanged between the spindles of the center and magazines of an adjacent tool storage unit without moving either the spindles of the unit. In addition, the spacing which must be maintained between tool carriers of such apparatus, to prevent interference between the carriers during rotations, is substantially diminished in comparison with the spacing between carriers which are required in prior art devices. It is anticipated that an embodiment of the present invention may be employed to automatically and simultaneously change tools in a multiple-spindle machining center wherein the minimum spacing between spindles is determined only by the geometry and dimensions of the spindles and spindleheads. However, it is by no means intended to limit the invention to such embodiment.

SUMMARY OF THE INVENTION

In the present invention, multiple spindle tool change apparatus is provided which includes a plurality of magazines, a particular magazine storing a number of tools for use with a particular one of the spindles. The apparatus further includes means for selectively positioning a tool in each of the magazines so that a plane which includes the axis of a first one of the selectively positioned tools and the axis of a first one of the spindles is different from a plane which includes the axis of a second one of the selectively positioned tools and the axis of a second one of the spindles. A tool transfer means maintains the axis of the first positioned tool in a particular plane as the tool transfer means moves the first positioned tool from a tool change position to the first spindle, and maintains the axis of the second positioned tool in a plane which is different from the particular plane as the tool transfer means moves the second positioned tool from a tool change position to the second spindle.

Preferably, the tool positioning means comprises means for controllably driving each of the magazines to move a selected tool in each of the magazines into a specified tool change position. Preferably also, each of the magazines comprises means for maintaining the axis of each of the tools stored for use with a particular spindle in a common plane, the axis of the particular spindle also being in the common plane.

In a preferred embodiment of the invention, the magazines are situated in relation to one another so that each plane in a plurality of spaced-apart parallel planes includes the axis of all of the tools which are stored in one of the magazines, regardless of the respective locations or orientations of tools in the magazine. The tool transfer means of the preferred embodiment includes a plurality of tool carrying devices, each tool carrying device being provided with a pair of tool grip elements for selectively engaging a tool in one of the magazines, and also a tool in one of the spindles. The tool transfer means further includes means for constraining all of the tool carrying devices to rotate simultaneously around a common axis during a tool change operation. Each of the magazines of the embodiment comprises a magazine structure which is provided with a number of tool retention sockets, all of the magazines being rotatable around a common axis to move a selected socket of each magazine into a tool change position.

OBJECTS OF THE INVENTION

An object of the present invention is to provide apparatus for automatically and simultaneously changing the tools in a multiple-spindle machining center, wherein the use of such apparatus does not place a constraint on the spacing or positioning of the spindles in relation to one another.

Another object is to provide apparatus of the above type which employs a plurality of tool carrying devices to move tools between respective spindles and each of a plurality of magazines, motion of the tool carrying devices during a tool change operation being limited to rotation around a common axis and to linear translation along two axes which are orthogonal to one another and to the common axis.

Another object is to provide tool change apparatus of the above type wherein the tool carrying devices are maintained in different spatial volumes, the volumes being in parallel, spaced-apart relationship with one another, each volume having a width which does not exceed the external diameter of a spindlehead to which it corresponds.

Another object is to provide tool change apparatus for a multiple-spindle machining center, wherein the axes of all the tools which may be used by a particular one of the spindles are maintained in a common plane, regardless of whether such tools are respectively being stored in a magazine, are being moved between the magazine and the particular spindle, or are inserted into the particular spindle for use in a machining operation.

Another object is to eliminate the need to move the spindles of a multiple-spindle machining center relative to a tool storage unit, or to move the storage unit relative to the spindles, in order to transfer tools between the spindles and the tool storage unit.

These and other object of the invention will become more readily apparent from the ensuing specification, when taken together with the drawings.

DETAILED DESCRIPTION OF THE PREFERRED EMBODIMENT

Figure 1:
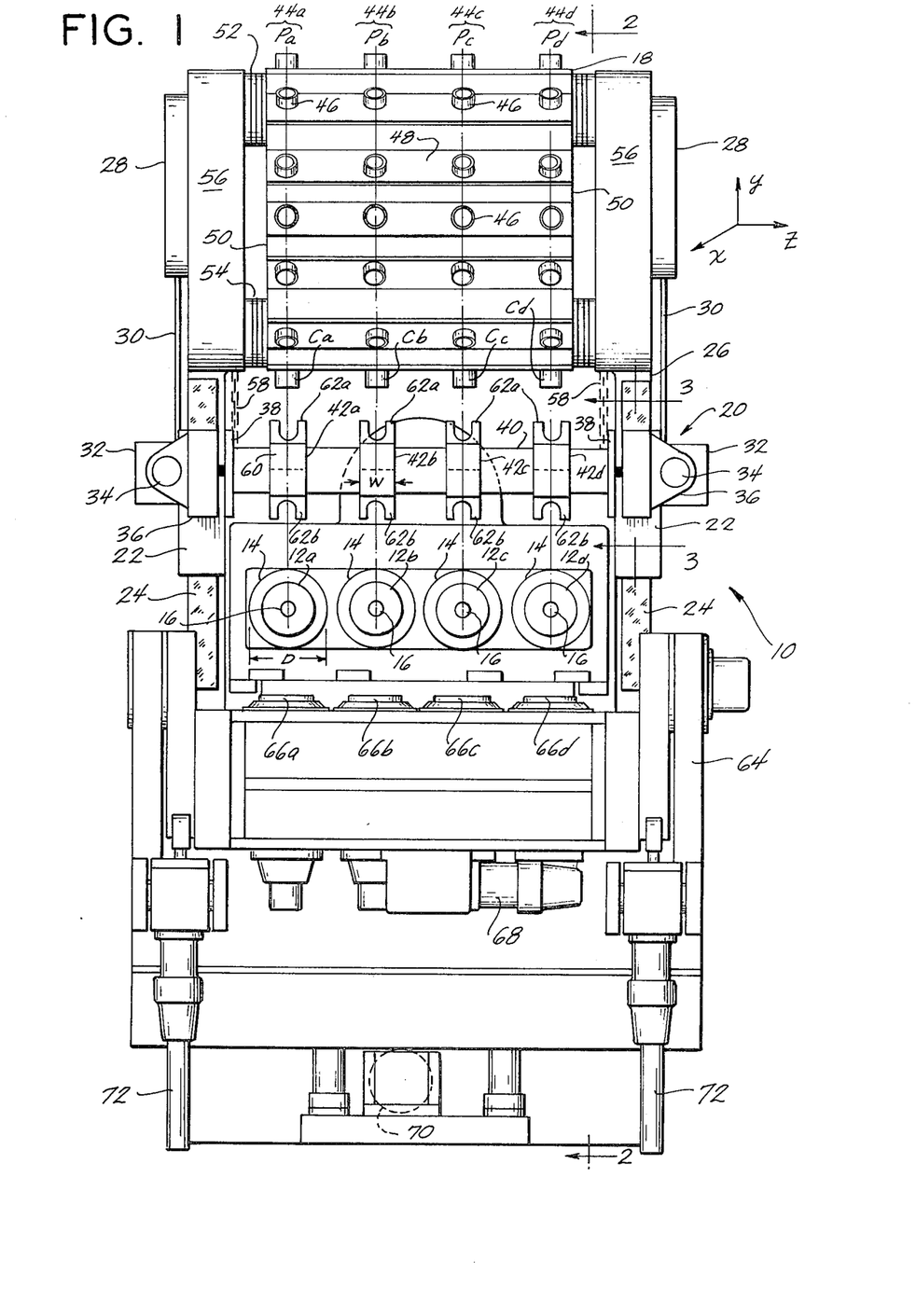
FIG. 1 is a front elevational view showing a multiple-spindle machining center which is provided with an embodiment of the invention.

Referring to FIG. 1, there is shown a machining center or machine tool 10 which is provided with a plurality of spindles 12a-d. Each spindle 12a-d is journalled in a spindle head 14, which has an external diameter D, and each spindle is provided with a spindle socket 16 into which various types of metal cutting tools may be removably inserted.

To insert tools into and remove tools from the spindles, and also to move tools between the spindles and a tool storage unit 18, machining center 10 is provided with a tool change assembly 20, which is structured in accordance with principles of the present invention. Assembly 20 includes vertical support slides 22, which constrain the assembly to move upwardly and downwardly along guideways 24, in parallel relationship with a y-axis. Guideways 24 are immovably joined to the frame or column 26 of machining center 10, and slides 22 are moved upwardly and downwardly therealong by means of hydraulic cylinders 28 which drive hydraulic cylinder rods 30, each rod 30 being joined to one of the slides. Cylinders 28 are affixed to tool storage unit 18, which is supported by column 26, and are controllably operated by a configuration of hydraulic lines, a hydraulic pump, and means for controlling pump operation. Such a configuration is considered to be well-known in the art, and is therefore not shown.

Assembly 20 further includes hydraulic cylinders 32, each of which is mounted upon one of the support slides 22 and is movable upwardly and downwardly therewith. Each cylinder 32 selectively drives a hydraulic cylinder rod 34 in parallel relationship with an x-axis, which is orthogonal to the y-axis, the operation of each cylinder 32 being controlled in the same manner as cylinders 28. A trunnion mount 36 is fixably joined to the end of each rod 34, and a trunnion 38 is rotatably joined to each trunnion mount 36. Trunnions 38 are rotated or indexed in relation to their respective mounts 36 by means of a trunnion drive which is housed in one of the trunnion mounts, and which is described hereinafter in conjunction with FIG. 3.

Assembly 20 is provided with a rigid tool carrier support bar 40, each end of bar 40 being fixably joined to one of the trunnions 38 so that bar 40 is rotatable around an axis. Such axis is parallel to a z-axis, which is orthogonal to both the x and y axes. Tool carriers 42a-d are fixably mounted on bar 40 in spaced apart relationship, and respectively correspond to spindles 12a-d, and also to tool storage magazines 44a-d of tool storage unit 18. From the above description of assembly 20, it will be seen that all of the tool carriers are constrained to translate together along the x and y axes, and to rotate together around the axis of the bar 40. Translations along the x and y axes are controlled by cylinders 28 and 32, respectively, and rotations of the tool carriers are controlled by the trunnion drive.

Each of the magazines 44a-d comprises a number of movable tool sockets 46. The axes of all of the sockets of a magazine lie in a common plane, and remain in the common plane regardless of movements of the sockets in relation to one another. The axes of the sockets of magazines 44a-d are respectively included in spaced-apart parallel planes $P_a-P_d$, the edges of which are shown in FIG. 1. The axes of spindles 12a-d are also respectively included in planes $P_a-P_d$. It follows therefrom that the axis of a tool stored in one of the magazines will always be coplanar with the axis of one of the spindles, regardless of the particular position of the tool in the magazine.

A tool storage unit having the above characteristics may be constructed or configured in various ways which will occur to those of skill in the art. In a very useful configuration, one tool socket 46 of each magazine is placed on one of a number of support plates 48, the ends of the support plates being joined to endless belts 50 so that the support plates are in spaced-apart parallel relationship with one another. Upper storage unit shaft 52 and lower storage unit shaft 54, which respectively pass through the upper and lower ends of belts 50, are journalled in magazine drive housings 56. Consequently, by controllably rotating shafts 52 and 54, a tool contained in one of the sockets 46 of a magazine can be moved into a tool change position. In FIG. 1, tools contained in sockets $C_a$–$C_d$ occupy tool change positions of magazines 44a–d, respectively.

Shafts 52 and 54 may be controllably rotated by any suitable means known in the art. For example, drive chains 58 may be fed up into the housings 56 and placed around sprockets joined to one of the shafts 52 or 54. Chains 58 may be controllably driven by a drive train (not shown) to move the sockets of a particular support plate 48 into the positions of sockets $C_a$–$C_d$.

Referring further to FIG. 1, there is shown each of the tool carriers 42a–d provided with two oppositely directed tool carrier arms 60. A tool grip element 62a is mounted at the end of one of the arms 60 of each tool carrier, and a tool grip element 62b is mounted at the end of each of the other arms 60 thereof. Tool grip element 62a and 62b comprise plier-like gripping elements which are commonly used in the machine tool arts for grasping and moving tools. By judicious placement of tool carriers 42a–d on bar 40, and by selective translation and rotation of bar 40 and tool carriers 42a–d, as hereinafter described, each tool grip element 62a may be brought into engaging relationship with a tool which is in one of the tool change sockets $C_a$–$C_d$. In like manner, each tool grip element 62b may be brought into engaging relationship with a tool which is in a socket 16 of one of the spindles 12a–d. By further selective translation and rotation of the tool carrier, the engaged tools may be respectively moved between tool change sockets $C_a$–$C_d$ and spindles 12a–d, while the axes of such engaged tools respectively remain in planes $P_a$–$P_d$.

By limiting motion of tool carriers 42a–d to linear translations along the x and y axes, and to rotation around the axis of bar 40, as aforedescribed, each tool carrier, as well as a tool carried thereby, is constrained to move within a unique volume of space during a tool change operation. That is, each tool carrier and engaged tool moves within a space which may not be entered by any of the other tool carriers or engaged tools, all of the spaces being in parallel relationship. Interference therefore cannot occur between respective carriers and engaged tools during tool change operations, regardless of the spacing or separation of the tool carriers along bar 40.

It will be seen from FIG. 1 that the width of each tool carrier 42a–d, and therefore the widths of the respective movement spaces thereof, has a value w. By constructing tool carriers 42a–d so that w is less than D, the external diameter of spindle heads 14, the spacing of spindles 12a–d in relation to another is made completely independent of any conditions required for the operation of tool change assembly 20. For example, all of the spindle heads 14 could be placed in abutting relationship, and the capability of assembly 20 to perform tool change operations in machining center 10 would be undiminished.

Referring once more to FIG. 1, there is shown a knee 64 which supports rotary tables 66a–d, each rotary table corresponding to one of the spindles 12a–d. Each table is positioned in relation to its corresponding spindle to rotatably support a workpiece (not shown) for processing by its spindle, each table being driven by a rotary table drive 68. Knee 64 is raised and lowered by means of a vertical feed motor 70. Ball screws housed in hollow shafts 72 tilt rotary tables 66a–d.

Figure 2:
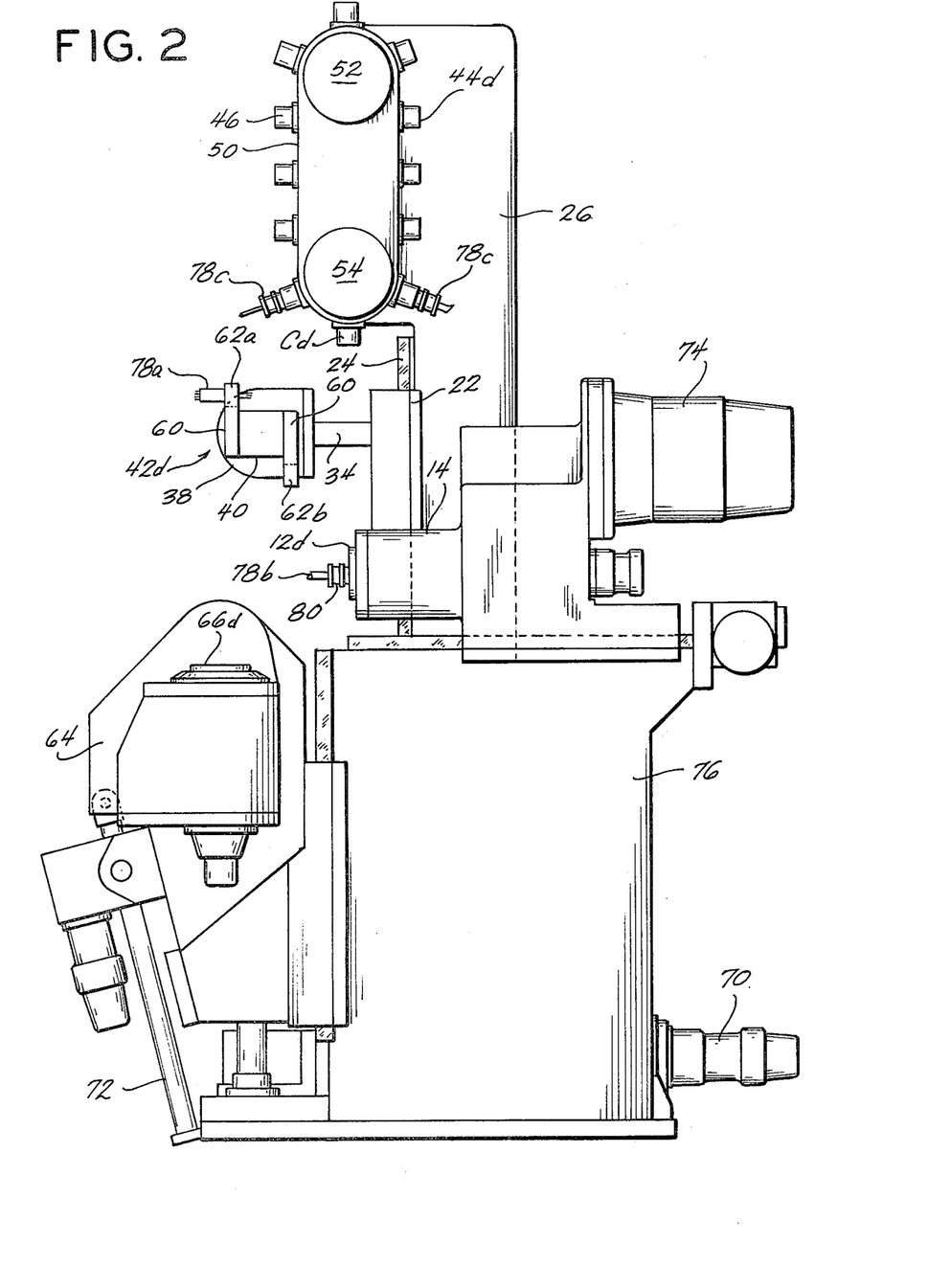
FIG. 2 is a sectional view taken through lines 2—2 of FIG. 1.

Referring to FIG. 2, there is shown column 26 and a spindle drive motor 74 mounted upon a base 76, knee 64 being slideably joined to base 76. There is further shown a tool 78a engaged by tool grip element 62a of tool carrier 42d, tool 78a having been removed from tool change socket $C_d$ by operation of tool carrier 42d. By selective manipulation of tool carrier 42d, as hereinafter described, tool grip element 62b is caused to grasp engagement portion 80 of tool 78b, tool 78b is withdrawn from the socket of spindle 12d, and tool 78a is inserted thereinto. Simultaneously therewith, though not shown, tool carriers 42a–c respectively remove tools 78b from the sockets of spindles 12a–c, and insert tools 78a–d thereinto, such tools having previously been removed from sockets $C_a$–$C_c$.

Referring further to FIG. 2, there are shown tools 78c, which comprise tools stored in respective sockets 46 of magazine 44d. As aforementioned, the axes of tools 78a, 78b and 78c of FIG. 2 are maintained in coplanar relationship with one another.

Figure 3:
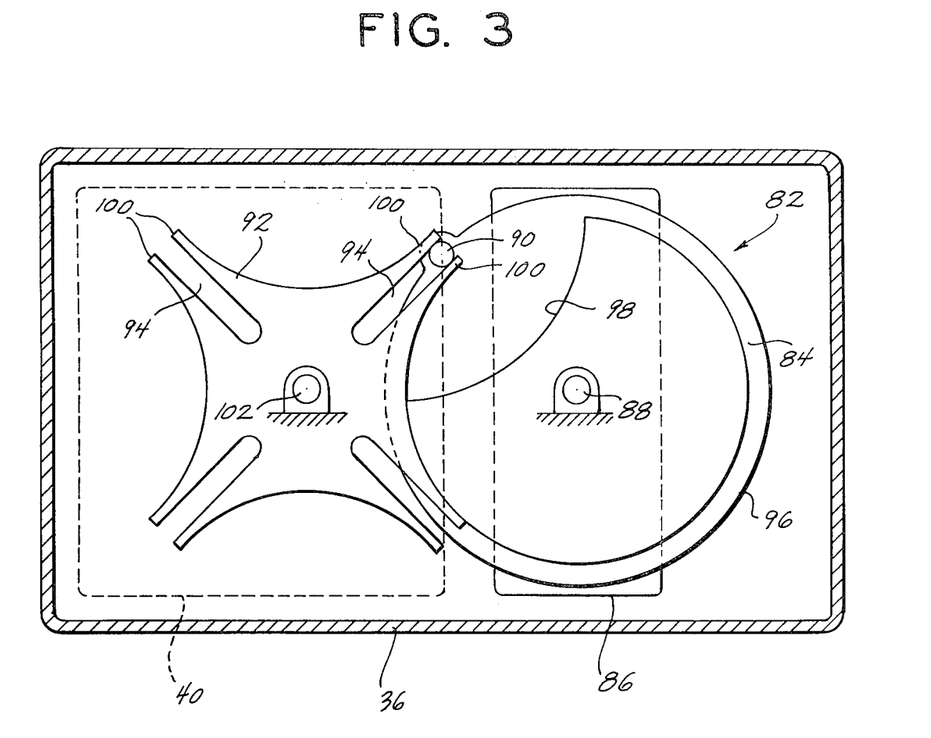
FIG. 3 is a sectional view taken through lines 3—3 of FIG. 1, and shows a trunnion drive for the embodiment thereof.

Referring to FIG. 3, there is shown a trunnion drive assembly 82 housed in one of the trunnion mounts 36, assembly 82 usefully comprising a Geneva drive system. In such systems, a driving member 84 is journalled within trunnion mount 36, and receives rotary driving motion from a rotary drive motor 86 through a shaft 88. Motor 86 may comprise either a hydraulic or electric motor, and is externally controlled to turn driving member 84 through a specified number of discrete revolutions, at a uniform rate of rotation.

Referring further to FIG. 3, there is shown a pin 90 which is tied or fixably joined to driving member 84 so that pin 90 rotates with member 84. A driven member 92 is journaled within trunnion mount 36, and is positioned in relation to driving member 84 so that pin 90 is able to enter one of the slots 94 of member 92, at some point during a revolution of member 84. When a pin 90 enters a slot 94, member 92 is caused to rotate, at a uniform rate and in a direction which is opposite to the direction of rotation of driving member 84. When member 92 has been turned through an angle or arc of 90° from its previous orientation, pin 90 slides out of the slot and rotation of member 92 ceases. Member 92 will remain in its new orientation unless member 84 is turned through a second discrete revolution, or else is rotated in a reverse direction.

To enable members 84 and 92 to turn freely in relation to one another, driving members 82 is configured so that it comprises a lower component 96 and an upper component 98, component 98 being shaped so that its curvature matches the curvature of each side of driven member 92. Also, member 98 is selectively shaped and mounted upon component 96 so that component 98 and ears 100 of member 92 do not interfere when member 92 is being driven by driving member 84.

Referring once more to FIG. 3, there is shown a journaled shaft 102 which is joined to both driven member 92 and tool carrier support bar 40, whereby rotary motion of member 92 is transferred to bar 40. Bar 40, and tool carriers 42a–d attached thereto, may therefore be controllably turned through a specified number of 90° arcs, or rotations, by directing motor 84 to turn driving member 84 through an equal number of complete revolutions.

Figure 4:
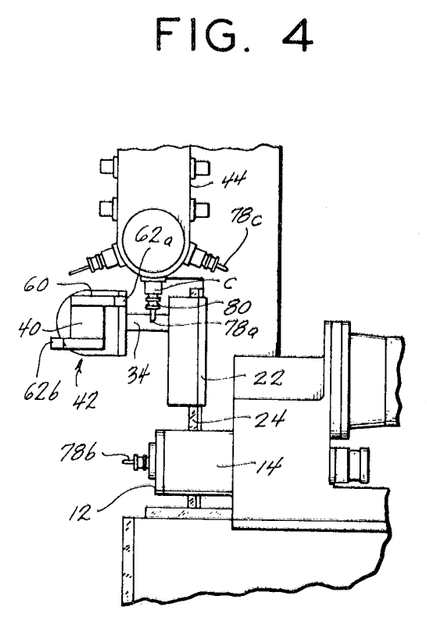
FIGS. 4-11 show various phases of a tool change operation performed by the embodiment of FIG. 1.

Referring to FIG. 4, there is shown tool carrier 42, comprising any one of the tool carriers 42a–d of tool change assembly 20, positioned by bar 40 to commence a tool change operation. When carrier 42 is in such position, slides 22 are fully raised vertically along guides 24, and rods 30 are fully raised vertically along guides 24, and rods 34 are fully extended out of cylinders 32. Bar 40 and tool carrier 42 are oriented so that arm 60 of element 62a is in perpendicular relationship with the axis of tool 78a, and are positioned so that element 62a is level with tool grip portion 80 of tool 78a. Tool 78a comprises the tool stored in a socket 46 of magazine 44 which has been moved to tool change position C, magazine 44 and position C respectively comprising the magazine of magazines 44a–d and the tool change position of tool change positions $C_a$–$C_d$ which correspond to tool carrier 42.

Figure 5:
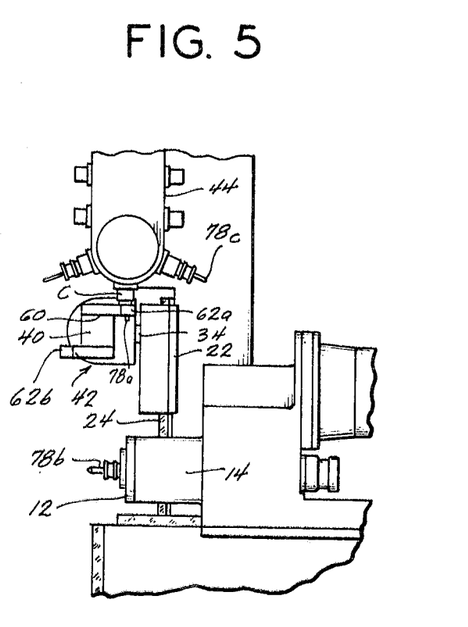

Referring to FIG. 5, rods 34 are fully retracted into their cylinders 32, whereby tool grip element 62a is caused to grasp engagement portion 80 of tool 78a.

Figures 6, 7:
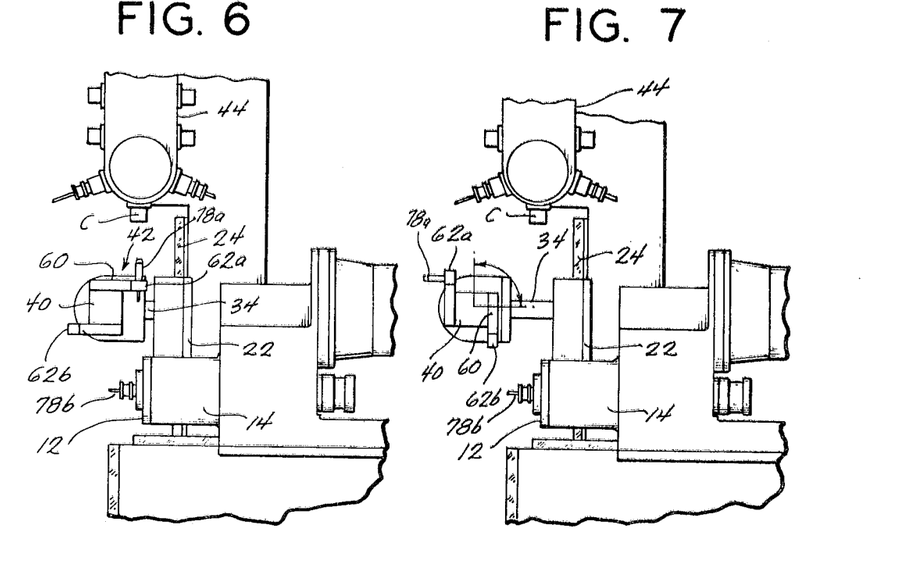

Referring to FIG. 6, slides 22 are moved downwardly to approximately the middle of guides 24, whereby tool 78a is removed from tool change socket C of magazine 44.

Referring to FIG. 7, rods 34 are again fully extended. In addition, bar 40, tool carrier 42 and tool 78a are shown to be rotated through a 90° arc by operation of the aforedescribed bar rotation drive 82. Arm 60 of element 62b and the axis of tool 78b are thereby placed in perpendicular relationship.

Figure 8:
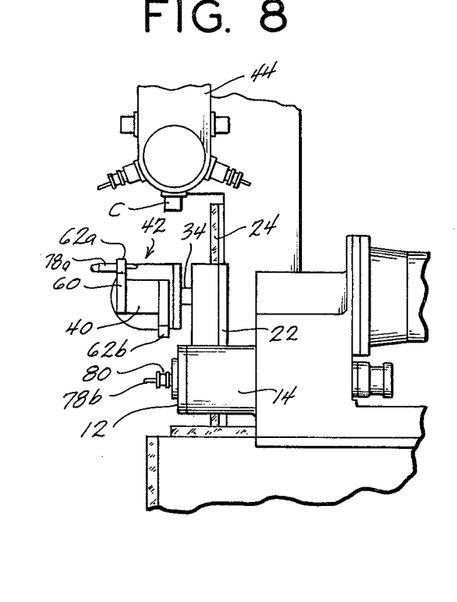

Referring to FIG. 8, rods 34 are again fully retracted. Tool grip element 62b is thereby positioned directly above engagement portion 80 of tool 78b, which is contained in the socket of spindle 12. Spindle 12 comprises the spindle of spindles 12a–d which corresponds to tool carrier 42.

Figure 9:
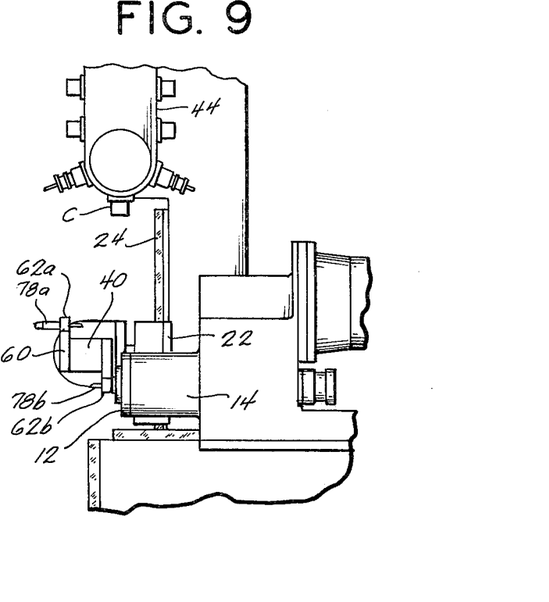

Referring to FIG. 9, slides 22 are fully lowered vertically along slides 24, whereby tool grip element 62b of carrier 42 is caused to grasp the tool engagement portion of tool 78b.

Figure 10:
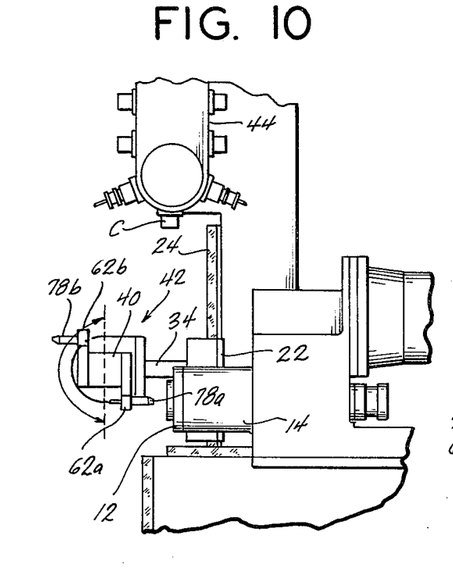

Referring to FIG. 10, rods 34 are once more fully extended outwardly from their cylinders 32, whereby tool 78b is withdrawn from the socket of spindle 12. In addition, FIG. 10 shows bar 40, tool carrier 42 and tools 78a and 78b rotated through an arc of 180°, by means of the bar rotation drive. The shank of tool 78a is thereby presented to the socket of spindle 12.

Figure 11:
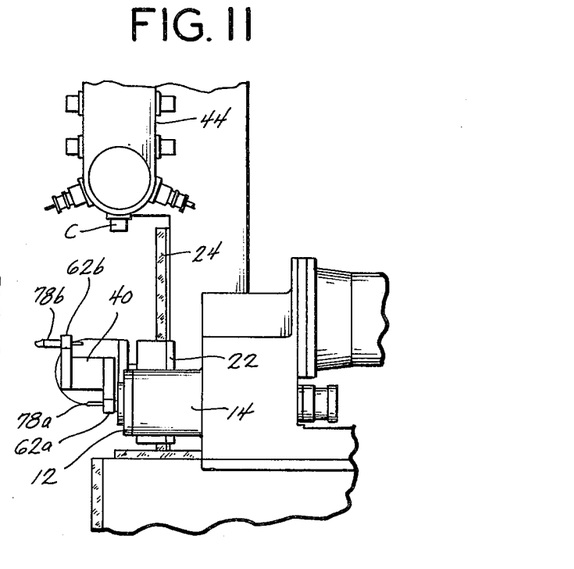

Referring to FIG. 11, rods 34 are once more fully retracted, whereby tool 78a is inserted into the socket of spindle 12. If bar 40 and tool carrier 42 are thereafter moved upwardly, tool 78a will remain in spindle 12a, for use thereby in a machining operation.

It will be readily apparent that by further translations of bar 40 and tool carrier 42 along the x and y axes, and by further rotations thereof around the bar axis, tool 78b may be placed into socket C of magazine 44, concluding a tool change operation.

It is anticipated that tool storage unit 18, hydraulic cylinders 28 and 32 and bar rotation drive assembly 82 may all be coupled to a control device, and may be made responsive thereto to act in co-operative relationship to move tool change assembly 20 through a tool change operation as described above. The control device may comprise for example, a computer control or other control device which is conventionally included in a machining center 10 to direct the overall operation thereof.

In a modification of the above embodiment, a system of rotatable chain magazines, such as the magazine system disclosed in aforementioned U.S. Pat. No. 3,571,912, may be substituted for magazines 44a–d of tool storage unit 18. Also, while the above embodiment discloses a machining center 10 having horizontal spindles, it is anticipated that a modified embodiment of the invention may be readily employed in a machining center which has a multiplicity of vertical spindles.

Obviously, many other modifications and variations of the present invention are possible in light of the above teachings, and it is therefore understood that within the scope of the disclosed inventive concept, the invention may be practiced otherwise than as specifically described.

What is claimed is:

1. Tool changing apparatus for use with a multiple-spindle machining center, said apparatus comprising:
   a tool carrying means corresponding to each of the spindles of said machining center, each of said tool carrying means comprising means for selectively engaging tools dedicated for use with one of said spindles, and for transporting engaged tools between one of said spindles and one of a plurality of tool storage magazines;
   first linear translation means for moving each of said tool carrying means in parallel relationship with a first axis when said tool carrying means are transporting engaged tools between said spindles and said magazines;
   second linear translation means for moving each of said tool carrying means in parallel relationship with a second axis when said tool carrying means are transporting engaged tools between said spindles and said magazines, said second axis being in orthogonal relationship with said first axis; and
   rotation means for rotating each of said tool carrying means around a common axis which is orthogonal to said first and second axes when said tool carrying means are transporting engaged tools between said spindles and said magazines.

2. The apparatus of claim 1 wherein:
   said first linear translation means comprises means for moving a rigid bar in parallel relationship with said first axis;
   said second linear translation means comprises means for moving said rigid bar in parallel relationship with said second axis;
   said rotation means comprises means for rotating said bar around an axis of rotation which is orthogonal to said first axis, to said second axis, and to the axes of said spindles; and
   said tool carrying means are affixed to said bar in selectively spaced relationship.

3. The apparatus of claim 2 wherein relative motion between said spindles and a tool storage unit containing said magazines does not occur, and wherein each of said tool carrying means comprises:
   a pair of arms joined to said bar in specified relationship with each other; and
   a tool grip element mounted at the end of each of said arms.

4. The apparatus of claim 2 wherein each of said magazines which corresponds to one of said spindles comprises means for selectively moving a tool into a tool change position, and wherein:
   each of said tool carrying means comprises a tool carrying device having a pair of arms which are mounted upon said bar in opposing relationship with one another, a first tool grip element being mounted upon the end of one of the arms of each of said tool carrier devices, and a second tool grip element being mounted upon the end of the other arm of each of said tool carrying devices; and said first and second linear translation means and said rotation means comprise means for operating in coordinated relationship to move said tool carrying devices so that every tool in a tool change position is simultaneously withdrawn from one of said magazines and inserted into a spindle by one of said tool carrying devices, the axis of a particular withdrawn tool and the axis of a particular spindle being maintained in a unique coplanar relationship during movements of said tool carrying devices.

5. The apparatus of claim 4 wherein:

said first linear translation means comprises means for moving said tool carrying devices in parallel relationship with said first axis to bring each of said first tool grip elements of said tool carrying devices into engaging relationship with a tool in one of said tool change positions; and said second linear translation means comprises means for moving said tool carrying devices in parallel relationship with said second axis to remove each of said tools engaged by one of said first tool grip elements from one of said tool change positions.

6. The apparatus of claim 5 wherein:

said second linear translation means comprises means for moving said tool carrying devices in parallel relationship with said second axis to bring each of said second tool grip elements of said tool carrying devices into engaging relationship with a tool in one of said spindles; and said first linear translation means comprises means for moving said tool carrying devices in parallel relationship with said first axis to remove each of said tools engaged by one of said second tool grip elements from one of said spindles.

7. The apparatus of claim 4 wherein:

said first and second linear translation means and said rotation means comprise means for operating in coordinated relationship to maintain the axis of each of said withdrawn tools in one of a number of spaced-apart parallel planes, each of said planes being orthogonal to said axis of rotation.

8. The apparatus of claim 4 wherein:

said first and second linear translation means and said rotation means comprise means for operating in coordinated relationship to move each of said tool carrying devices through one of a number of parallel movement spaces, the movement space of a given one of said tool carrying devices having a width which does not exceed the external diameter of the spindle head of a spindle to which said given tool carrying device corresponds.

9. The apparatus of claim 4 wherein:

said first linear translation means comprises first hydraulic cylinders having pistons which are joined to the ends of said rigid bar for controllably displacing said rigid bar along said first axis;

said second linear translation means comprises second hydraulic cylinder which are displaced along said first axis by the operation of said first hydraulic cylinders, said second hydraulic cylinders having pistons which are joined to the ends of said rigid bar for controllably displacing said rigid bar along said second axis; and said rotation means comprises a rotary drive system joined to an end of said bar for rotating said rigid bar around said axis of rotation in specified coordinated relationship with said displacements of said rigid bar along said first and second axes.

10. In a tool change mechanism for changing the tools in a plurality of spindles of a machine tool simultaneously: a separate tool storage magazine for each of said spindles with each magazine removably supporting a plurality of tools for use in its associated spindle; a tool change station in each of said magazines; means for moving the tools of each of said magazines into the tool change station associated with that magazine; a bar movably supported between said tool storage magazines and the spindles; a plurality of tool grips fixed to said bar and adapted to secure the tools for transferring them between the respective tool change stations of said tool storage magazines and the spindles; means for moving said bar rectilinearly for producing a like unitary movement of said tool grip in the tool change cycle; and means for rotating said bar for producing a like unitary rotary movement of said tool grips so that all the movements of said grips to complete a tool change cycle are produced by actuating said bar in its rectilinear and rotary movements.

11. A tool change mechanism according to claim 10 wherein the rectilinear movement of said bar is in two directions including: means for moving said bar rectilinearly in a first direction for moving said tool grips into engagement with the tools in the tool change stations of said magazines and for extracting tools from and inserting them into said spindles; and means for moving said bar rectilinearly in a second direction for moving said tool grips into engagement with the tools in the spindles and for extracting tools from and inserting them into said tool storage magazines.

12. A tool change mechanism according to claim 11 wherein said first direction of movement is a horizontal direction and said second direction of movement is a vertical direction.

13. Tool changing apparatus for use with a multiple-spindle machining center, said apparatus comprising:

a plurality of tool storage means, each of said tool storage means comprising means for positioning a first metal cutting tool in prespecified relationship with one of the spindles of said machining centers;

a plurality of tool carrying devices, each of said tool carrying devices including a first tool grip element which is associated with one of said first tools, and a second tool grip element which is associated with a second tool inserted into one of said spindles;

means for rotating all of said tool carrying devices around a common axis which is orthogonal to the axes of said spindles to place each of said first tools in coaxial relationship with one of said spindles;

manipulating means selectively translating said tool carrying devices so that all of said first tool grip elements engage their associated first tools simultaneously and remove their associated first tools from said tool storage means simultaneously, and so that all of said second tool grip elements engage their associated second tools simultaneously and remove their associated second tools from said spindles simultaneously;

a first linear translation means for selectively moving each of said tool carrying devices in parallel relationship with a first axis, said first axis being in orthogonal relationship with said common axis; and a second linear translation means for controllably moving each of said tool carrying devices in parallel relationship with a second axis, said second axis being in orthogonal relationship with said common axis and with said first axis.

14. The apparatus of claim 13 wherein:

said tool storage means comprise magazines for storing selected numbers of metal cutting tools, and further comprise magazine drive means for selectively moving tools within said magazines to place a selected tool in each of said magazines in a prespecified spatial relationship with one of said spindles;

all of said tool carrying devices are mounted upon a rigid bar in selectively spaced-apart relationship, each of said tool carrying devices being associated with one of said magazines and with one of said spindles;

means are coupled to said bar for controllably rotating said bar around the axis of said bar, said axis of said bar comprising said common axis;

a first set of hydraulic cylinders is joined to said bar for controllably translating said bar and said tool carrying devices in parallel relationship with said first axis; and a second set of hydraulic cylinders is joined to said bar for controllably translating said bar and said tool carrying devices in parallel relationship with said second axis.

* * * * *